US00RE39346E

(19) United States
(12) Reissued Patent
Lifson

(10) Patent Number: US RE39,346 E
(45) Date of Reissued Patent: Oct. 17, 2006

(54) SCROLL COMPRESSOR WITH LUBRICATION OF SEALS IN BACK PRESSURE CHAMBER

(75) Inventor: Alexander Lifson, Manlius, NY (US)

(73) Assignee: Carrier Corporation, Syracuse, NY (US)

(21) Appl. No.: 10/217,272

(22) Filed: Aug. 12, 2002

Related U.S. Patent Documents

Reissue of:
(64) Patent No.: 6,149,413
Issued: Nov. 21, 2000
Appl. No.: 09/114,650
Filed: Jul. 13, 1998

(51) Int. Cl.
*F04C 18/04* (2006.01)
*F04C 18/00* (2006.01)

(52) U.S. Cl. ..... 418/55.5; 418/55.4; 418/55.6; 418/55.1; 418/57; 418/99

(58) Field of Classification Search ..... 418/55.5, 418/55.4, 55.6
See application file for complete search history.

(56) References Cited

U.S. PATENT DOCUMENTS 4,552,518 A * 11/1985 Utter ..... 418/55.6
4,596,521 A * 6/1986 Murayama et al. ..... 418/55.6
5,040,956 A * 8/1991 Barito et al. ..... 418/55.5
5,178,527 A * 1/1993 Jung ..... 418/55.6
5,212,964 A * 5/1993 Utter et al. ..... 418/55.6
5,370,513 A * 12/1994 Fain ..... 418/55.6
5,449,279 A * 9/1995 Hill et al. ..... 418/55.5
5,720,602 A 2/1998 Hill et al. ..... 418/55.4
5,989,000 A * 11/1999 Tomayko et al. ..... 418/55.5
6,422,843 B1 * 7/2002 Sun et al. ..... 418/55.4

FOREIGN PATENT DOCUMENTS

JP 06307354 A * 11/1994

* cited by examiner

*Primary Examiner*—Thomas Denion
*Assistant Examiner*—Thai-Ba Trieu
(74) *Attorney, Agent, or Firm*—Carlson, Gaskey & Olds

(57) ABSTRACT

A scroll compressor lubrication system includes a number of embodiments where lubricating oil impinges off surfaces adjacent to the orbiting scroll. The impinged oil creates a lubrication mist, which is deposited on the back surface of the orbiting scroll baseplate. The surface of the orbiting scroll onto which the oil has been deposited rubs against and carries the oil to the back chamber seals and to the back chamber. The seals thus are being lubricated by oil transfer from the back surface of the orbiting scroll to the seals. Sine the oil is deposited on the surface of the orbiting scroll, while it is exposed to suction pressure, only minimal pressurization of oil is required. Thus, there is no damage to the back pressure chamber seals due to over pressurization.

24 Claims, 3 Drawing Sheets

SCROLL COMPRESSOR WITH LUBRICATION OF SEALS IN BACK PRESSURE CHAMBER

Matter enclosed in heavy brackets [ ] appears in the original patent but forms no part of this reissue specification; matter printed in italics indicates the additions made by reissue.

BACKGROUND OF THE INVENTION

This invention relates to a scroll compressor with a lubrication system for indirectly conveying lubricant to the back pressure chamber seals.

Scroll compressors are becoming widely utilized in refrigerant compression applications. Essentially, a scroll compressor consists of two scroll members with one orbiting relative to the other. Each scroll members includes a spiral wrap extending from a base. The spiral wraps interfit to define compression pockets. As the orbiting scroll moves relative to the non-orbiting scroll, the size of compression pockets becomes smaller and fluid trapped inside the pockets becomes compressed. There is a separating force generated from the compressed fluid tending to bias the two scroll members away from each other.

To counteract the separating force, it is known to tap a pressurized fluid to a chamber behind the base of one of the scroll wraps. Two seals typically define the boundaries of the chamber. Pressure in the back chamber acting over the scroll base creates a force tending to bias the scroll members back together, and acts in a direction opposite to the separating force discussed above.

The back pressure chamber seals are subject to many challenges and, in known compressors, often fail. One cause of seal failure is the lack of oil to lubricate seals.

It has been proposed in the past to deliver lubricant directly to the back chamber seals. In such proposals the oil needs to be additionally pressurized, thus creating complications. First, the compressor needs means for pressurizing the oil. Also, the seals may be damaged due to overcompression of the oil in the supply line. Also, the slight axial movement of the orbiting scroll can overcompress oil in the back chamber, creating another cause of seal damage.

SUMMARY OF THE INVENTION

In a disclosed embodiment of this invention, lubricant is indirectly supplied to the outer and inner back pressure chamber seals of the scroll compressor. That is, the lubricant impinges off of a surface adjacent to the back pressure chamber seals, and then is carried to the back pressure chamber seals. In this way, adequate lubrication is provided to the back pressure chamber seals.

In one embodiment, the lubricant is directed to an outer seal by impinging off the crankcase towers or compressor shell, and in a second embodiment, the lubricant is directed to an outer seal by impinging off an end face of the crankcase adjacent to the outer seal or off a surface of an antirotation coupling. In either case, an oil mist is created which is deposited on the rear face of the orbiting scroll plate as the orbiting scroll rotates. As the orbiting scroll continues to rotate the rear face of the orbiting scroll, which is covered by oil mist, is moved over and comes in contact with the stationary back chamber outer seal. Thus, providing effective oil lubrication of the seal.

Lubricant is preferably also supplied to the inner seal. In one embodiment, a passage extends through the hub of the orbiting scroll. The oil expelled through this passage impinges on an inner portion of the crankcase. Again, an oil mist is created by this impingement, and the mist is deposited on the rear face of the orbiting scroll, from which it is carried to the inner seal.

It should be noted that since the oil is deposited on the surface of the orbiting scroll while it is exposed to suction pressure, only minimal oil pressurization is required; just enough to create an issuing jet. Thus, no additional means to pressurize the oil are required except as provided by the existing oil delivery system.

Although the present invention as specifically disclosed has a back pressure chamber disposed behind the orbiting scroll, it should be understood that the invention also extends to a back pressure chamber defined behind the non-orbiting scroll.

These and other features of the present invention can be best understood from the following specification and drawings, the following of which is a brief description.

DETAILED DESCRIPTION OF A PREFERRED EMBODIMENT

Figure 1:
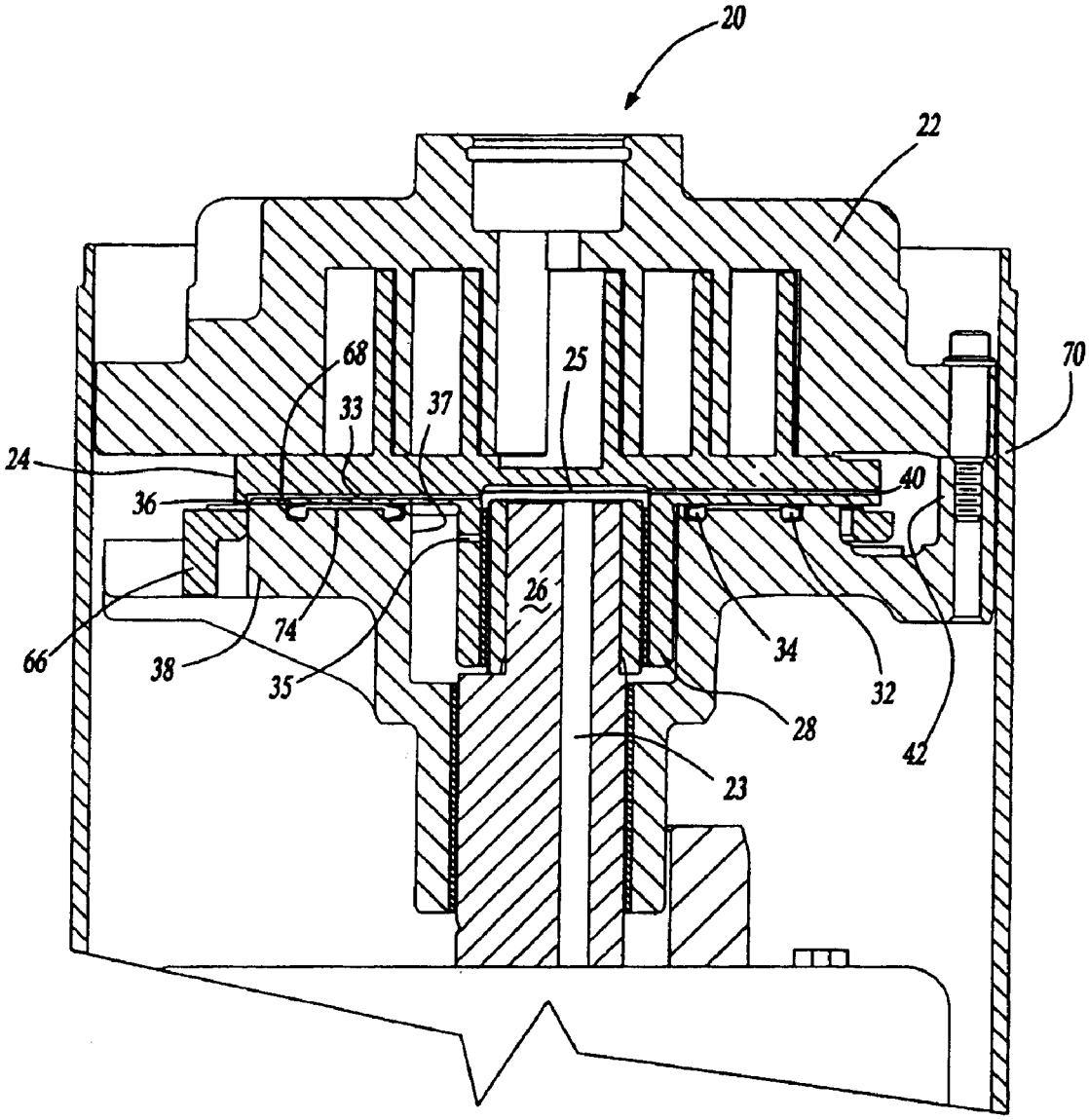
FIG. 1 shows a cross-sectional view of a scroll compressor incorporating the present invention.

A scroll compressor 20 is shown in FIG. 1 incorporating a non-orbiting scroll 22 and an orbiting scroll 24. As known, a shaft 26 drives the orbiting scroll through a hub 28 to orbit relative to the non-orbiting scroll 22. As known, an oil passage 23 extends through shaft 26 to deliver oil to a chamber 25. Oil in chamber 25 is then available for distribution to different locations of scroll compressor.

Figure 3:
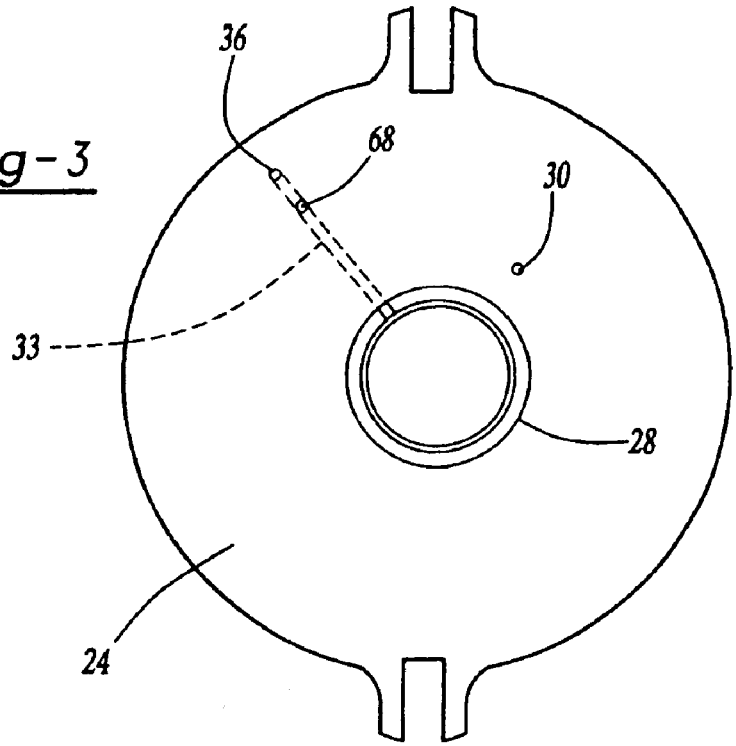
FIG. 3 shows a view of a rear face of an orbiting scroll according to one embodiment of the present invention.

A tap 30, shown schematically in FIG. 3, taps pressurized fluid from chambers between the wraps of the orbiting and non-orbiting scrolls to a back pressure chamber 74 defined between seals 32 and 34. Seals 32 and 34 are shown to be received in respective circumferentially extending grooves 62 and 64 in crankcase 38.

A passage 33 receives oil from chamber 25, and extends from the inner surface of the hub 28 to a downwardly extending tap 68. Oil leaving tap 68 impinges on end face 80 of the crankcase 38 adjacent to the outer seal 32.

Another tap 36 can be added. This tap extends downward. Oil leaving tap 36 impinges off the antirotation coupling 66, adjacent to the outer seal 32.

Another tap 35 extends from chamber 25 through the inner hub groove 50, and provides a passage for impinging oil off of a surface 37 on the crankcase. Another passage 40 extends from chamber 25 outwardly through an outer peripheral wall of the orbiting scroll 24. The oil which leaves the passage 40 through the opening 72 impinges off the crankcase tower 42 or off the scroll compressor shell surface 70.

In all of the above arrangements, the oil impingement creates a mist, and the mist is delivered onto a rear face 76 of the orbiting scroll. The rear face of the orbiting scroll then carries the mist to the inner and outer seals 32 and 34, and back chamber 74. The tap 35 provides lubrication for the inner seal 34 and the tap 68 and 36, and opening 72 provide lubrication for the outer seal 32. It should be understood that taps 35, 36, 68 or opening 72 can be used singularly, or in combination with each other. Further, by delivering the oil to the rear of the orbiting scroll at even one location, will improve the lubrication of both seals as the movement of the orbiting scroll causes the oil to be distributed to each and around the entire circumference of the respective seals.

Figure 2:
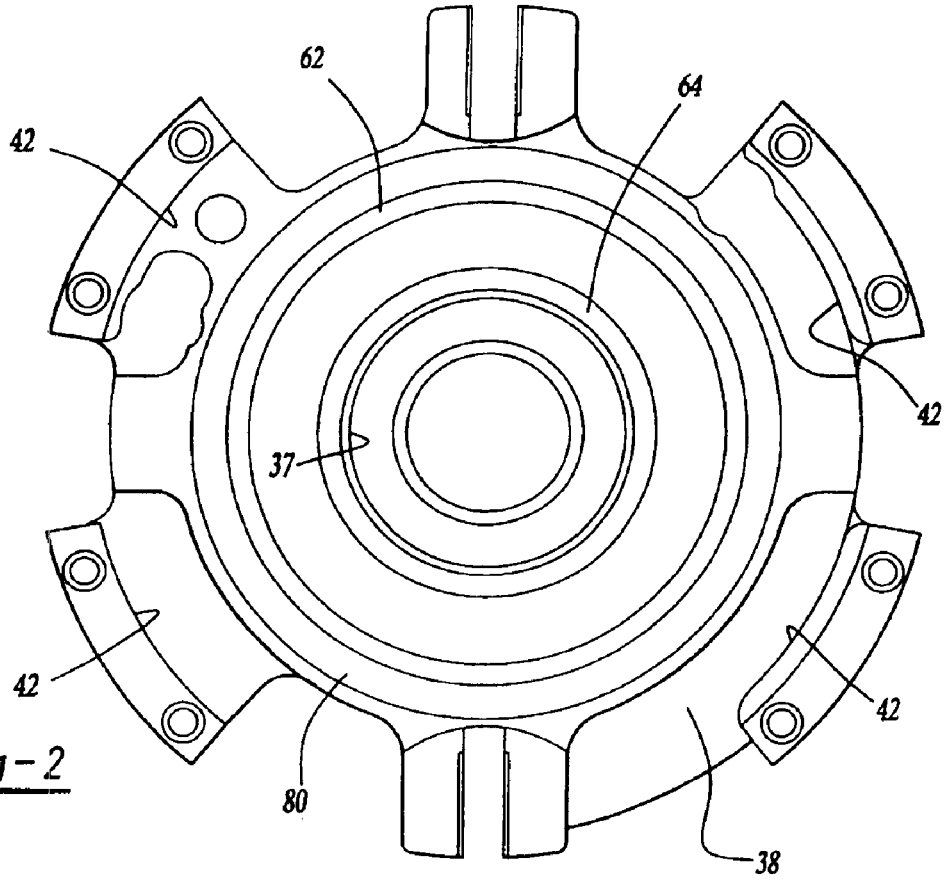
FIG. 2 shows a view of a crankcase according to the present invention.

Shown in FIG. 2 are surfaces 37 and crankcase towers 42. Oil expelled from tap 35 impinges on surface 37 and oil expelled from passage 40 through opening 72 which is located in line with crankcase tower 42 impinges on surface of crankcase tower 42.

As shown in FIG. 3, oil expelled from tap 36 impinges off end face 80 of crankcase 38 and is directed onto a rear face of orbiting scroll.

Figure 4:
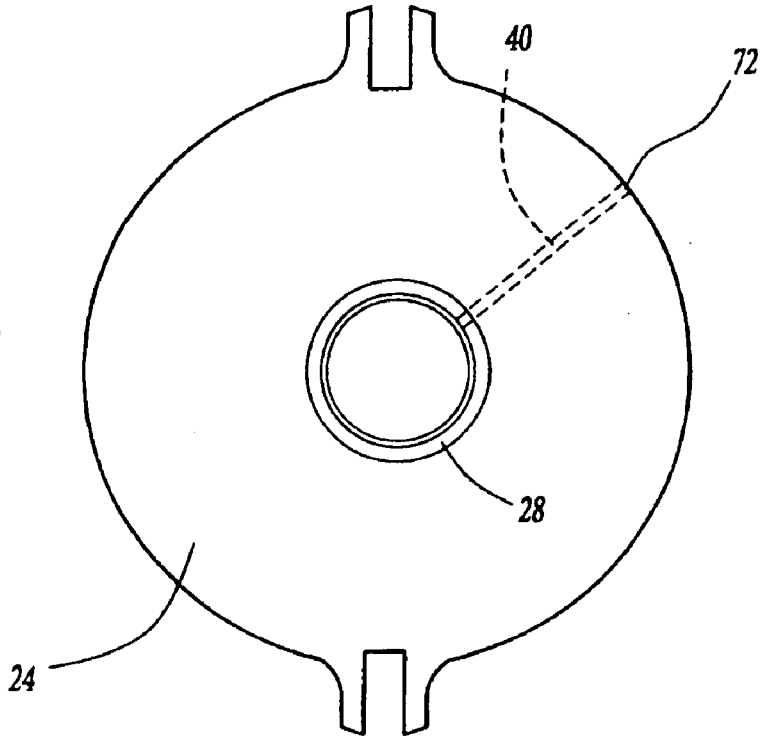
FIG. 4 shows a view of a rear face of an orbiting scroll according to another embodiment of the present invention.

FIG. 4 shows passage 40 extending outwardly to an outer peripheral surface of the orbiting scroll 24. Oil expelled from this passage impinges off crankcase tower 42 or compressor shell 70.

Figure 5:
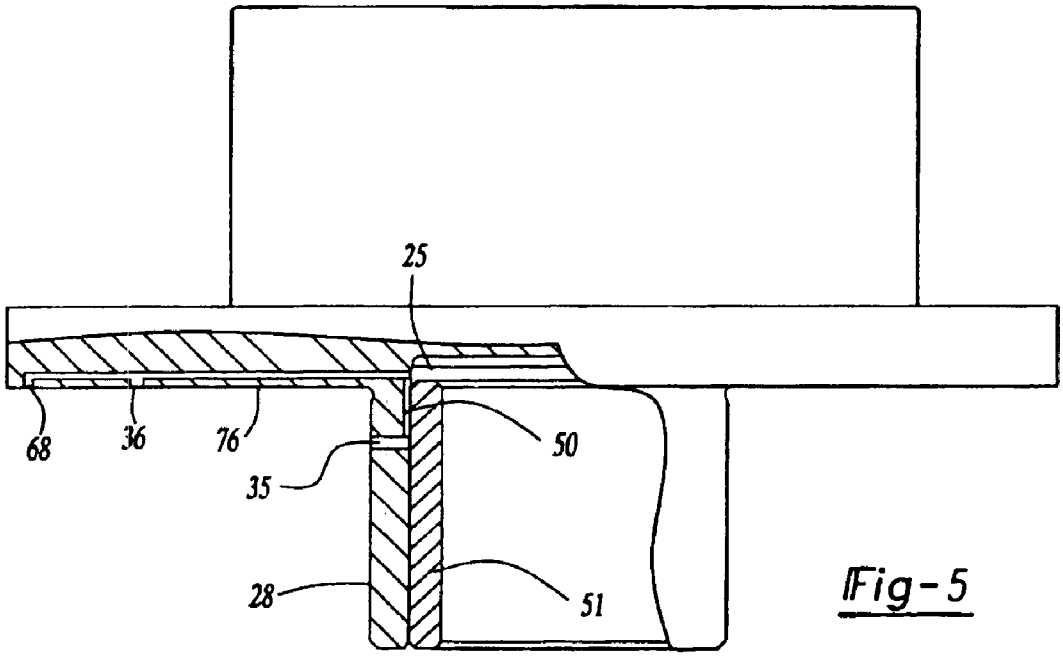
FIG. 5 shows a cross-sectional view of an orbiting scroll with further definition of the features of the present invention.

FIG. 5 shows a detail of the passage 35, wherein groove 50 is formed on the inner peripheral surface of the hub 28 to pass lubricant from chamber 25 to groove 50 and to tap 35. The groove 50 is formed between a bearing bushing 51 and the inner surface of the hub.

Preferred embodiments of this invention have been disclosed; however, a worker of ordinary skill in the art would recognize that certain modifications come within the scope of this invention. For that reason, the following claims should be studied to determine the true scope and content of this invention.

What is claimed is:

1. A scroll compressor comprising:

a first scroll having a base and a spiral wrap extending from said base;

a second scroll having a base and a spiral wrap extending from said base;

said spiral wraps of said first and second scrolls interfitting to define compression chambers;

a tap for fluid pressure extending to a back pressure chamber behind said base of one of said first and second scrolls;

seals being positioned at radially inner and outer positions to define inner and outer boundaries for said back pressure chamber; and a lubricant supply system for supplying lubricant to surfaces adjacent to said inner and outer seals such that said lubricant is delivered outside said back pressure chamber to both said inner and outer seals, there being a first passage delivering oil to a location radially outward of said outer seal, and a second passage delivering lubricant to a position radially inward of said inner seal.

2. A scroll compressor as recited in claim 1, wherein said first scroll orbits relative to said second scroll, and said back pressure chamber is defined behind said orbiting scroll base.

3. A scroll compressor as recited in claim 2, wherein a crankcase is positioned rearwardly of said base of said orbiting scroll, and said seals are received in grooves in said crankcase.

4. A scroll compressor as recited in claim 3, wherein said lubricant supply system includes a passage directing a lubricant jet to impinge off of a face of said crankcase behind said base of said orbiting scroll, and slightly radially outwardly of said outer seal.

5. A scroll compressor as recited in claim 3, wherein said lubricant system includes a passage extending radially outwardly through an outer peripheral surface of said scroll and for directing a lubricant jet to impinge off a crankcase tower located on an outer periphery of said crankcase and past said base of said orbiting scroll.

6. A scroll compressor as recited in claim 3, wherein said lubricant system includes a passage extending radially outwardly through an outer peripheral surface of said scroll and for directing a lubricant jet to impinge a portion of a compressor housing shell.

7. A scroll compressor as recited in claim 3, wherein said lubricant supply system includes a passage extending through a hub of said orbiting scroll and for directing a lubricant jet to impinge off an inner surface of said crankcase to lubricate said inner seal.

8. A scroll compressor as recited in claim 7, wherein said hub of said scroll compressor includes a groove defined between a hub and bearing bushing, said bearing bushing being positioned between a shaft for driving said orbiting scroll and said groove, said lubricant supply system including a passage extending radially outwardly through said hub and communicating with said groove.

9. A scroll compressor as recited in claim 3, wherein said lubricant supply system includes a passage directing a lubricant jet to impinge off a surface of an anti-rotation coupling.

10. A scroll compressor comprising:

an orbiting scroll including a base and a spiral wrap extending from said base;

a non-orbiting scroll including a base and a spiral wrap extending from said base;

said wraps of said orbiting and non-orbiting scroll wraps interfitting to define compression chambers;

a shaft extending into a hub in said orbiting scroll and adapted to cause said orbiting scroll to orbit relative to said non-orbiting scroll;

a tap extending through a base of said orbiting scroll to supply fluid to a back pressure chamber behind said base of said orbiting scroll;

a crankcase positioned behind said base of said orbiting scroll, said crankcase having a face facing said base of said orbiting scroll, said crankcase face including two grooves defined at radially inner and outer locations, and there being inner and outer seals in said inner and outer grooves; and a lubricant supply system for supplying lubricant through said shaft and to each of said inner and outer seals, said lubricant supply system supplying a lubricant to a surface of said crankcase adjacent to said inner and outer seals such that said lubricant does not impinge directly on said seals, but is still delivered to said inner and outer seals, there being a first passage delivering oil to a location radially outward of said outer seal, and a second passage delivering lubricant to a position radially inward of said inner seal.

*11. A scroll compressor as recited in claim 1, wherein said lubricant supply system obtains oil to deliver to said first passage from a location on a remote side of said base of said one of said first and second scrolls from a side of said base facing said compression chambers.*

*12. A scroll compressor comprising:*

*a first scroll having a base and a spiral wrap extending from said base;*

*a second scroll having a base and a spiral wrap extending from said base;*

*said spiral wraps of said first and second scrolls interfitting to define compression chambers;*

*a tap for fluid pressure extending to a back pressure chamber behind said base of one of said first and second scrolls;*

*seals being positioned at radially inner and outer positions to define inner and outer boundaries for said back pressure chamber; and*

*a lubricant supply system for supplying oil to a surface adjacent to said outer seal such that said oil is delivered outside said back pressure chamber to said outer seal, there being a first passage delivering said oil to a location radially outward of said outer seal.*

*13. A scroll compressor as recited in claim 12, wherein said first scroll orbits relative to said second scroll, and said back pressure chamber is defined behind said orbiting scroll base.*

*14. A scroll compressor as recited in claim 13, wherein a crankcase is positioned rearwardly of said base of said orbiting scroll, and said seals are received in grooves in said crankcase.*

*15. A scroll compressor as recited in claim 14, wherein said lubricant supply system includes a passage directing a lubricant jet to impinge off of a face of said crankcase behind said base of said orbiting scroll, and slightly radially outwardly of said outer seal.*

*16. A scroll compressor as recited in claim 14, wherein said lubricant system includes a passage extending radially outwardly through an outer peripheral surface of said scroll and for directing a lubricant jet to impinge off a crankcase tower located on an outer periphery of said crankcase and past said base of said orbiting scroll.*

*17. A scroll compressor as recited in claim 14, wherein said lubricant system includes a passage extending radially outwardly through an outer peripheral surface of said scroll and for directing a lubricant jet to impinge a portion of a compressor housing shell.*

*18. A scroll compressor as recited in claim 14, wherein said lubricant supply system includes a passage directing a lubricant jet to impinge off a surface of an anti-rotation coupling.*

*19. A scroll compressor as recited in claim 12, wherein said lubricant system includes a main oil supply passage in fluid communication with said back pressure chamber supplying said oil to said chamber.*

*20. A scroll compressor as recited in claim 19, wherein said first scroll is driven by a shaft to orbit said first scroll relative to said second scroll, and said main oil supply passage is disposed within said shaft.*

*21. A method of providing lubricant to a seal in a scroll compressor comprising the steps of:*

*providing a first scroll having a base and a spiral wrap extending from its base and a second scroll having a base with a spiraling wrap extending from said base, said inner fitting said spiral wraps of said first and second scrolls to define a compressor chamber;*

*providing a tap for fluid pressure from one of said compression chambers to a back pressure chamber to find behind said base of one of said first and second scrolls;*

*providing seals positioned at both radially inner and outer positions to define radially inner and outer boundaries for said back pressure chamber; and*

*supplying lubricant to a surface outwardly of said outer seal such that oil is delivered outside said back pressure chamber and to said outer seal, a first passage delivering said oil to a location radially outward of said outer seal.*

*22. A method as set forth in claim 21, wherein said lubricant supply system further including the steps of also supplying lubricant to a location radially inward of said inner seal.*

*23. A method as set forth in claim 21 further including the steps of driving said one of said first and second scrolls to orbit, such that said back pressure chamber is defined behind said base of said orbiting scroll.*

*24. A method as set forth in claim 21, wherein said lubricant is supplied to said first passage from a location on a remote side of said base of said one of said first and second scrolls from a side of said base of said one of said first and second scrolls facings said compression chambers.*

* * * * *